Patented Nov. 25, 1947

2,431,417

UNITED STATES PATENT OFFICE 2,431,417

RECOVERY OF GLUTEN AND PRODUCTS THEREOF

James H. Obey, Pittsburgh, Pa., assignor, by mesne assignments, of 9448/10570 to Chemprotin Products, Trenton, Mich., a limited partnership of Michigan, 561/10570 to Laszlo Kormendi, New York, N. Y., and 561/10570 to B. Clark Boeckeler, Grosse Ile, Mich.

No Drawing. Application May 12, 1944,
Serial No. 535,400

18 Claims. (Cl. 106—153)

This invention relates to the production of purified gluten and concentrated gluten dispersions from cereal such as wheat, and is herein disclosed in some detail as embodied in the procedures for recovering a substantially undenatured and unhydrolyzed gluten from wheat flour as a paint vehicle and as a film.

It has hitherto been found possible to dissolve the gluten in a strong aqueous sodium salicylate solution and then separate it from other substances by decanting the supernatant liquor from insoluble substances and then isolating the extracted and purified gluten.

That procedure proved unsatisfactory because large amounts of sodium salicylate were required, and the sodium salicylate proved difficult to remove by any reasonable amount of washing.

Ammonium hydroxide also has been used to extract the gluten, but that required long mixing and large quantities to dissolve the gluten. Sodium hydroxide solution dissolved the gluten but apparently altered its properties fundamentally by causing a hydrolysis of the material. Therefore a commercial process for dissolving gluten by means of aqueous sodium hydroxide, sodium salicylate, or ammonium hydroxide alone did not seem feasible.

According to the present invention, a dilute solution of the salicylate plus a little ammonia may be used to dissolve the gluten thus avoiding waste and avoiding any need of using large quantities of acid in the subsequent neutralizing of the ammonia or other alkali present.

In one example, 200 grams of a gluten-bearing wheat flour, sold under the trade-name of "alcomeal," were suspended at a temperature of 20° C. in 1800 cc. of a water solution carrying 4.4 grams sodium salicylate and 24 cc. of 29% ammonium hydroxide.

The suspension was stirred for more than half an hour or perhaps an hour and the starch and other material allowed to settle.

The clear supernatant liquor was decanted off, filtered and the gluten precipitated with 6N acetic acid.

The precipitate fell rapidly, was washed twice with cold water, filtered by suction and dried on the filter paper. The resultant brittle film was ground and proved suitable for many industrial purposes.

According to another procedure, the dry ground gluten was stirred with a somewhat stronger solution of sodium salicylate, warmed and then made somewhat alkaline with a slight excess of ammonium hydroxide and stirred, usually one to two hours, yielding a concentrated dispersion suitable for many purposes.

Glycerine was added in one instance as a plasticizing agent. Polyvinyl alcohol dispersed in water was added in another example to make a tougher film.

The following was useful to form water-removable films such as are used as temporary masks to keep sprayed paint off selected areas and to protect structural elements from being scratched by careless handling.

100 grams of gluten were suspended in water and then there was added 10 grams solid sodium salicylate and 3 cc. 29% aqua ammonia, until there had been added all told 450 cc. cold water. Then there was added a preservative such as 1.5 grams sodium-ortho-phenyl-phenate and 12 to 30 grams of glycerine. The resulting dispersion having a pH of 7.3 to 8 was of medium to heavy viscosity and could be diluted with water and applied by brushing, spraying or dipping and dried to form a protective coating. It possessed definite thixotropic properties as indicated by thinning during agitation and thickening when quiescent, thus being admirably suited to being pigmented and brushed on. The suspension described above was cast into highly elastic films.

A paint, easily removable when partly dry, but adequately adhesive when dry and then washable and fairly free from brush marks when dry was made as follows:

A dispersion of gliadin was prepared by treating 310 grams commercial gluten with 1400 cc. of 85% ethanol denatured with methanol. The clear liquid was separated, decolorized with activated charcoal, filtered and concentrated under a vacuum. The resulting dispersion contained 21.7% gluten or gliadin.

20 grams of the above dispersion, equal to 4.35 grams contained gliadin
6.5 grams linseed oil
16.5 grams zinc oxide
12.5 grams titanium oxide The linseed oil was first emulsified by the gliadin dispersion and then the pigments were stirred in. The mixture was thinned with 15 cc. water and 5 cc. ethanol, and then with a little caustic soda solution to stabilize it. The mixture flowed and brushed well. It was possible to substitute other drying oils for linseed and to substitute potassium salicylate for sodium salicylate.

These examples are illustrative of the methods embodying my invention, and it is to be understood that the proportions of solvents and alkali are merely illustrative since other proportions and equivalents may be employed within the scope of my invention as indicated by the following claims:

Having thus described in some detail certain embodiments of my invention, I claim:

1. The process of dissolving gluten which consists in agitating the gluten containing material in a dilute solution of sodium salicylate in water carrying a considerably larger amount of ammonium hydroxide.

2. The process of separating gluten from a starch carrying it which consists in agitating the gluten-bearing starch in a dilute solution of sodium salicylate carrying a considerably larger amount of ammonium hydroxide, allowing the starch and insoluble material to settle, and separating the gluten solution from the settled material.

3. The process of dissolving gluten which consists in agitating the gluten-containing material in water carrying about a quarter of one per cent of sodium salicylate and a few times as much ammonium hydroxide.

4. The process of separating gluten from a starch carrying it which consists in agitating the gluten-bearing starch in water carrying about a quarter of one percent of sodium salicylate and a few times as much ammonium hydroxide, allowing the starch and insoluble material to settle, separating the gluten solution from the settled material and drying the gluten.

5. The process of dispersing gluten which consists in treating gluten-bearing material with dilute sodium salicylate solution in the presence of ammonia at a pH of about 9.

6. A suspension of gluten in water carrying sodium salicylate, ammonia and a hydroxyl compound of the group consisting of glycerine and polyvinyl alcohol as a plasticizer.

7. A suspension of gluten adapted to serve as a paint, comprising water, an alkali metal salicylate, enough ammonia to produce a pH of about 8, and a hydroxyl compound of the group consisting of glycerine and polyvinyl alcohol as a plasticizer.

8. The process of dissolving gluten which consists in agitating the gluten containing material in a dilute solution of potassium salicylate in water carrying a considerably larger amount of ammonium hydroxide.

9. The process of separating gluten from a starch carrying it which consists in agitating the gluten-bearing starch in a dilute solution of potassium salicylate carrying a considerably larger amount of ammonium hydroxide, allowing the starch and insoluble material to settle, and separating the gluten solution from the settled material.

10. The process of dissolving gluten which consists in agitating the gluten-containing material in water carrying about a quarter of one per cent of potassium salicylate and a few times as much ammonium hydroxide.

11. The process of separating gluten from a starch carrying it which consists in agitating the gluten-bearing starch in water carrying about a quarter of one percent of potassium salicylate and a few times as much ammonium hydroxide, allowing the starch and insoluble material to settle, separating the gluten solution from the settled material and drying the gluten.

12. The process of dispersing gluten which consists in treating gluten-bearing material with dilute potassium salicylate solution in the presence of ammonia at a pH of about 9.

13. A suspension of gluten in water carrying potassium salicylate, ammonia and a hydroxyl compound of the group consisting of glycerine and polyvinyl alcohol as a plasticizer.

14. A suspension of gluten adapted to serve as a paint, comprising water, potassium salicylate, enough ammonia to produce a pH of about 8, and a hydroxyl compound of the group consisting of glycerine and polyvinyl alcohol as a plasticizer.

15. A suspension of gluten in water carrying a little alkali metal salicylate and also carrying a little ammonia.

16. A suspension of gluten in dilute ammonium hydroxide containing an alkali metal salicylate.

17. An aqueous suspension of gluten containing sodium salicylate and a larger proportion of amonium hydroxide.

18. An aqueous suspension of gluten containing potassium salicylate and a larger proportion of ammonium hydroxide.

JAMES H. OBEY.

REFERENCES CITED

The following references are of record in the file of this patent:

UNITED STATES PATENTS

| Number | Name | Date |
|---|---|---|
| 2,105,760 | Swallen | Jan. 18, 1938 |
| 872,987 | Capehart | Dec. 3, 1907 |
| 1,280,861 | Satow | Oct. 8, 1918 |
| 2,210,481 | Brother et al. | Aug. 6, 1940 |
| 2,245,100 | Berstein | June 10, 1941 |
| 2,311,485 | Sturken | Feb. 16, 1943 |
| 2,185,110 | Coleman | Dec. 26, 1939 |
| 2,338,151 | Weber | Jan. 4, 1944 |
| 2,185,118 | Coleman | Dec. 26, 1939 |
| 1,275,324 | Takamine | Aug. 13, 1918 |